UNITED STATES PATENT OFFICE.

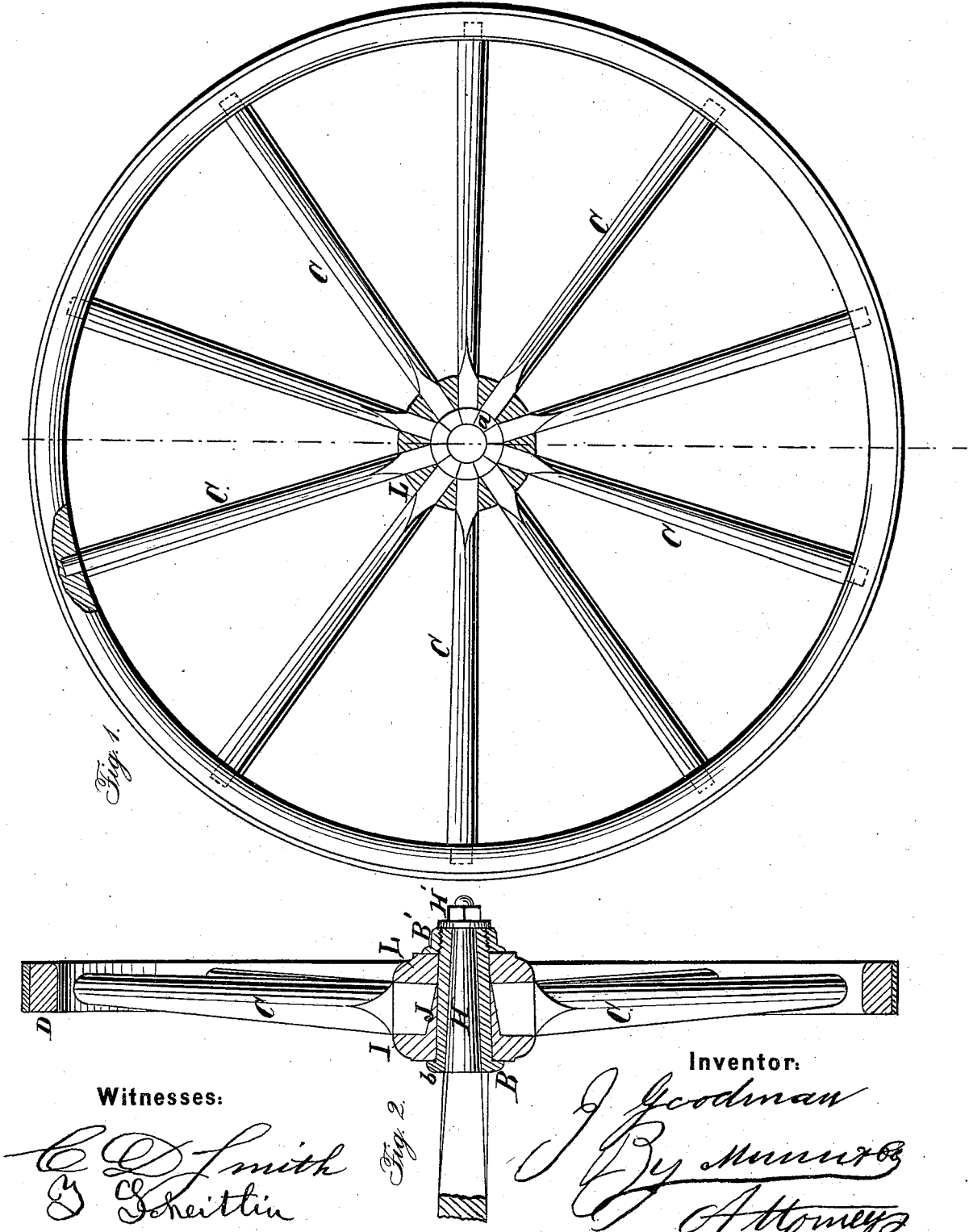

JOSEPH GOODMAN, OF BLACKFRIARS ROAD, COUNTY OF SURREY, ENGLAND, ASSIGNOR TO CHARLES P. BUTTON, OF NEW YORK, N. Y.

IMPROVEMENT IN CARRIAGE-WHEELS.

Specification forming part of Letters Patent No. 46,524, dated February 21, 1865.

*To all whom it may concern:*

Be it known that I, JOSEPH GOODMAN, of Blackfriars Road, in the county of Surrey, England, have invented a new and Improved Wheel for Carriages, &c.; and I do hereby declare that the following is a full, clear, and exact description thereof, which will enable those skilled in the art to make and use the same, reference being had to the accompanying drawings, making a part of this specification, in which—

Figure 1 represents a sectional front elevation of my invention, the plane of section being indicated by the line $y\ y$, Fig. 2. Fig. 2 is a transverse central section of the same, the line $x\ x$, Fig. 1, indicating the plane of section.

Similar letters of reference indicate corresponding parts.

This invention consists in the employment or use of a disk with a conical central boss upon the boxing, in combination with a grooved plate and its central opening, and with the spokes and felly or tire of a wheel, in such a manner that by screwing the disk and plate together the spokes are forced out to a uniform distance from the center and securely clamped, and the felly or tire is equally strained throughout its whole circumference, and brought in the position of a true circle.

L represents a disk, made of wood or metal and provided with a series of radial grooves to receive the inner ends of the spokes C, as clearly shown in the drawings. Said plate is perforated with a conical central hole, $a$, to receive the conical boss J of a disk, I, which is made of wood or metal, and which is secured upon a boxing, B, by a nut, B'. The spokes C are secured with their outer ends in the felly D or tire in the usual manner, and they are so proportioned that before the disk I is attached to the grooved plate L their inner ends slightly project into the conical opening $a$.

As the conical boss J of the disk I is introduced into the opening $a$ of the grooved plate L, the spokes are gradually forced out in radial directions, and the felly or tire is brought in a truly circular position and equally strained throughout. The nut $b$ serves to draw the disk L up to the flange or disk I, and to fasten the two together, the disk I having a firm bearing against the shoulder $b$ on the boxing B.

In practice the disk or plate L and the disk I will be made cheapest of cast-iron, and a wheel can thus be produced which is perfectly round, which has its spokes uniformly tightened throughout, and the circumference of which forms a true circle. It can be used for carriages or wheel vehicles of every description, and it is equally applicable to such axles which rotate with the wheels, as to such on which the wheels rotate while they (the axles) remain stationary.

If applied to a stationary axle, as in the present illustration, the boxing passes over the spindle H, and is secured thereon by a nut, H'; but if the axle is to rotate with the wheel the boxing is dispensed with, when the shoulder on the axle answers the purpose of the shoulder or flange $b$.

What I claim as new, and desire to secure by Letters Patent, is—

The disk I, with conical central boss J, in combination with the grooved disk L and its central opening, $a$, and with the spokes C, and felly or tire D, constructed and operating in the manner substantially as herein described, so that by screwing the two plates together the spokes are forced out to a uniform distance from the center and securely clamped.

JOSEPH GOODMAN.

Witnesses:
J. BURTON JONES,
GEORGE NEISH STANLEY.